United States Patent [19]

Nanataki et al.

[11] Patent Number: 5,171,721

[45] Date of Patent: Dec. 15, 1992

[54] CERAMIC GREEN SHEET FOR POROUS LAYER, ELECTROCHEMICAL ELEMENT USING THE GREEN SHEET, AND METHOD OF PRODUCING THE ELEMENT

[75] Inventors: Tsutomu Nanataki; Kazuyoshi Shibata, both of Nagoya, Japan

[73] Assignee: NGK Insulators, Ltd., Japan

[21] Appl. No.: 666,734

[22] Filed: Mar. 8, 1991

[30] Foreign Application Priority Data

Mar. 12, 1990 [JP] Japan .................... 2-60814

[51] Int. Cl.$^5$ .............................................. C04B 38/06
[52] U.S. Cl. ...................................... 501/81; 501/103; 501/127; 501/134
[58] Field of Search ............... 501/103, 127, 120, 134, 501/80, 81; 264/44

[56] References Cited

U.S. PATENT DOCUMENTS

| | | | |
|---|---|---|---|
| 4,221,594 | 9/1980 | Greskovich | 106/40 R |
| 4,240,891 | 12/1980 | Bannister | 204/195 S |
| 4,735,666 | 4/1988 | Mase et al. | 156/89 |
| 4,900,698 | 2/1990 | Lundsager | 501/80 |
| 4,937,214 | 6/1990 | Morita et al. | 501/127 |
| 4,973,435 | 11/1990 | Jain et al. | 264/29.6 |
| 5,017,522 | 5/1991 | Hegedus | 501/81 |

*Primary Examiner*—Mark L. Bell
*Assistant Examiner*—Alan Wright
*Attorney, Agent, or Firm*—Parkhurst, Wendel & Rossi

[57] ABSTRACT

A ceramic green sheet which is fired to give a porous ceramic structure, and which is formed of a composition which principally consists of a ceramic powder, a binder, and a multiplicity of planar or elongate flakes which disappear upon application of heat, and which are oriented in the ceramic green sheet in a direction substantially parallel to opposite major surfaces of the green sheet. Also disclosed is an electrochemical element having a protective layer covering at least one electrode, which layer is prepared from the ceramic green sheet indicated above, and has a multiplicity of planar or elongate pores corresponding to the planar or elongate flakes included in the green sheet. A method of producing the electrochemical element is also disclosed.

9 Claims, 4 Drawing Sheets

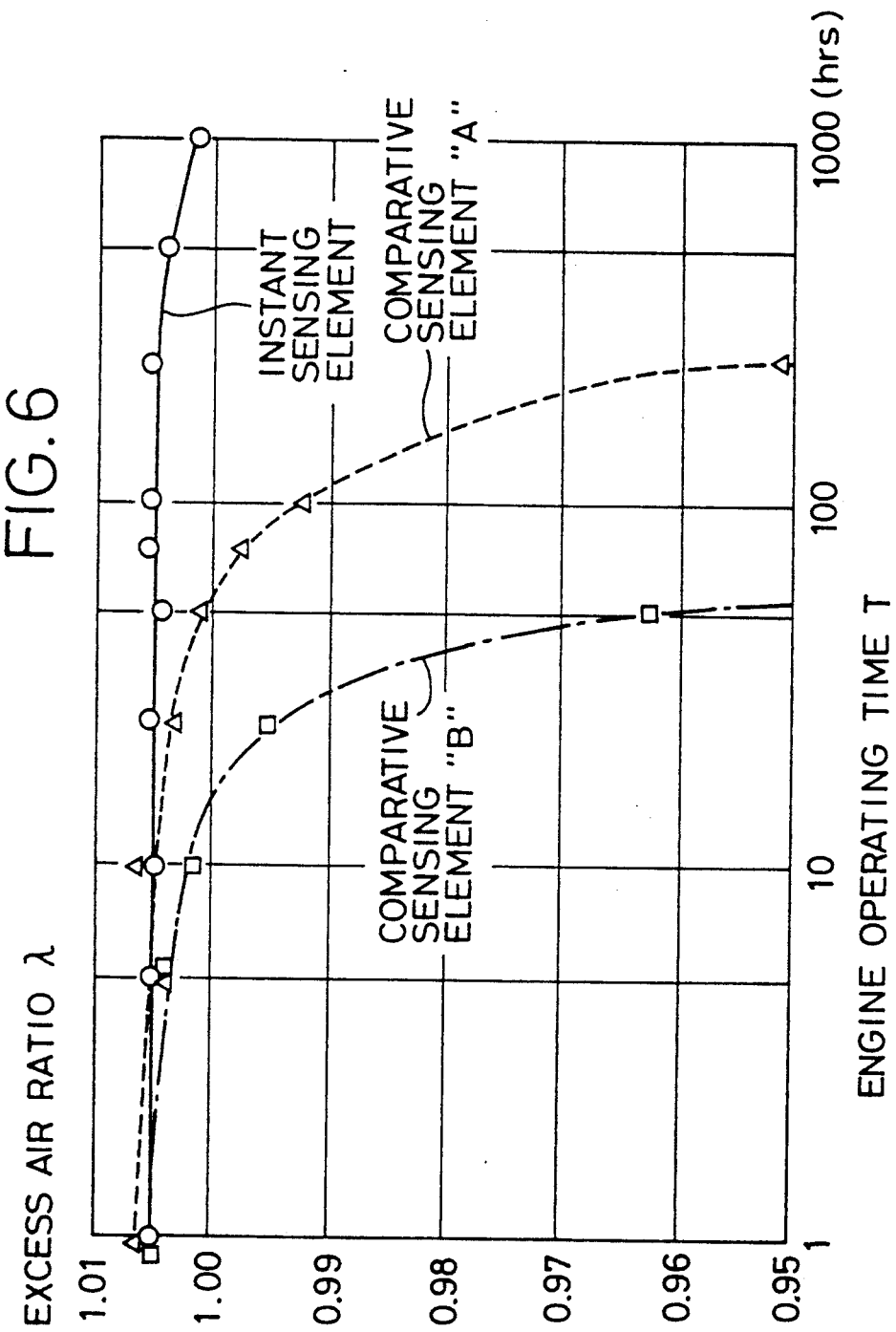

CERAMIC GREEN SHEET FOR POROUS LAYER, ELECTROCHEMICAL ELEMENT USING THE GREEN SHEET, AND METHOD OF PRODUCING THE ELEMENT

BACKGROUND OF THE INVENTION

1. Field of the Invention

The present invention relates generally to a ceramic green sheet, more particularly, to a ceramic green sheet which is used for providing an electrode protective layer of an electrochemical element adapted to detect or determine the concentration of a given component of a subject gas to be measured. The invention is also concerned with an electrochemical element which has an electrode protective layer prepared from such a ceramic green sheet, and a method of producing such an electrochemical element.

2. Discussion of the Prior Art

Porous ceramic structures or layers having a multiplicity of mutually connected pores have been widely used for various purposes. For example, a porous ceramic layer is used as a gas-permeable protective layer which covers an electrode of an oxygen sensing element or other electrochemical element for determining the concentration of a given component of a subject gas. This porous protective ceramic layer is used for protecting the electrode which is directly exposed to the subject gas, e.g., an exhaust emission produced by internal combustion of an air-fuel mixture. Namely, the porous protective layer serves to protect the electrode against adverse influences of corrosive substances, such as lead, phosphorus, silicon and sulfur. When the electrode is exposed to these corrosive substances, the sensing element tends to suffer from a change in the control point, reduction in the output, and deterioration of the operating response. The porous protective layer also serves to prevent volatilization of the electrode components at an elevated temperature, thereby assuring improved durability of the sensing element. Where cracks occur in the protective layer during use of the sensing element, therefore, the electrode is directly exposed to a corrosive gas having a high temperature, resulting in corrosion and volatilization of the exposed electrode. In this case, the sensing element substantially loses its sensing capability.

The porous ceramic layer used as an electrode protective layer is formed by plasma-spraying a suitable ceramic material such as spinel so as to cover the electrode, and/or a substrate such as a solid electrolyte body on which the electrode is formed. Alternatively, a green sheet of a suitable ceramic material is laminated on a solid electrolyte body or other substrate, so as to cover the electrode formed on the substrate, and the green sheet is fired into the porous electrode protective layer integral with the substrate. Generally, the porous ceramic layer prepared from a ceramic green sheet is given a suitable porosity, in one of the following manners: (1) The green sheet is fired such that the sintering of the ceramic powder is insufficient; (2) The green sheet contains a relatively large amount of binder; and (3) The green sheet contains an organic additive or additives other than the binder, which additives are burned out during firing of the green sheet.

The porous ceramic layer formed by the plasma-spraying technique has low mechanical strength, and tends to suffer from cracking or flake-off due to a thermal shock or stress. Further, it is generally difficult to practice the plasma-spraying technique, when the desired thickness of the porous ceramic layer exceeds 100 μm.

The porous ceramic layer formed by the green sheet lamination method has a multiplicity of pores which provide relatively short fluid passages or channels (gas-permeation paths) through which a gaseous fluid flows, for example. In this case, the gaseous fluid flowing through the passages immediately reaches the surface of the substrate on which the porous layer is formed. Accordingly, when the porous ceramic layer is used as an electrode protective layer of an electrochemical element, such as an oxygen sensing element, the protective layer is not able to sufficiently remove corrosive substances contained in a subject gas. Consequently, the sensing element thus obtained tends to suffer from a change in the control point, reduction in the output, and deterioration of the operating response, and is therefore unsatisfactory in its durability.

SUMMARY OF THE INVENTION

The present invention was developed in view of the above-discussed background. It is accordingly a first object of the present invention to provide a ceramic green sheet which is fired to give a porous ceramic layer having comparatively long gas- or fluid-flow paths.

It is a second object of the invention to provide a highly durable electrochemical element which has a porous ceramic structure obtained from such a ceramic green sheet as described above.

It is a third object of the invention to provide a method of producing such a highly durable electrochemical element, in particular, an oxygen sensing element.

The first object may be attained according to a first aspect of the present invention, which provides a ceramic green sheet which is fired to give a porous ceramic structure, and which is formed of a composition which principally consists of a ceramic powder, a binder, and a multiplicity of planar or elongate flakes which disappear upon application of heat, and which are oriented in the ceramic green sheet in a direction substantially parallel to opposite major surfaces of the green sheet.

The ceramic green sheet prepared according to the present invention incorporates the planar or elongate flakes which disappear upon application of heat, and which are oriented in the direction substantially parallel to the opposite major surfaces of the green sheet. Upon firing of the ceramic green sheet, the planar or elongate flakes as well as the binder are burned out, vaporized, sublimed, or thermally decomposed, to thereby provide generally planar or elongate pores corresponding to the planar or elongate flakes. Thus, there is obtained a porous ceramic structure or layer which includes a multiplicity of pores which are oriented in the direction substantially parallel to the major surfaces of the fired ceramic layer.

FIGS. 1(a) and 1(b) illustrate a porous ceramic sheet which is formed by firing a ceramic green sheet prepared according to the present invention. As a result of vaporization, sublimation or thermal decomposition of the planar or elongate flakes incorporated in the ceramic green sheet, a multiplicity of pores 2 each having a generally planar or elongate shape are formed in the porous ceramic sheet, such that each pore extends in a direction substantially parallel to the major surfaces of the ceramic sheet. These pores 2 communicate with each other in the porous ceramic sheet, to thereby provide relatively long fluid passages or channels which extend from one of the opposite major surfaces of the porous ceramic sheet to the other surface, as indicated by an arrow in FIG. 1(b).

On the other hand, a porous ceramic sheet which is obtained by firing a conventional ceramic green sheet has a multiplicity of amorphous pores 4, as shown in FIGS. 2(a) and 2(b). As specifically shown in FIG. 2(b), the pores 4 are mutually connected to provide fluid passages or channels which extend from one major surface of the porous sheet to the other surface, substantially in the direction of thickness of the ceramic sheet. Namely, the fluid permeation or flow paths formed through this porous ceramic sheet do not have many portions which extend in a direction substantially parallel to the major surface of the ceramic sheet. Thus, the length of the fluid permeation paths formed through the conventional porous ceramic sheet is generally much smaller than that of the paths formed through the ceramic sheet as shown in FIGS. 1(a) and 1(b).

The second object may be attained according to a second aspect of the invention, which provides an electrochemical element comprising: (a) a solid electrolyte body; (b) a plurality of electrodes formed on the solid electrolyte body; and (c) a protective layer covering at least one of the electrodes. The protective layer consists of a ceramic porous layer having a multiplicity of mutually connected pores each of which has a generally planar or elongate shape, the pores being oriented in a direction substantially parallel to the opposite major surfaces of the protective layer.

In the electrochemical element constructed according to the present invention, the ceramic porous layer as the electrode protective layer has generally planar or elongate pores which are oriented in the direction substantially parallel to the major surfaces of the porous layer. These pores communicate with each other to provide relatively long fluid passages or channels, through which a subject gas to be measured flows toward the electrode that is covered by the protective layer. Accordingly, the electrode is prevented from direct exposure to the subject gas, and is therefore protected against adverse influences due to corrosive substances contained in the subject gas. Consequently, the electrochemical element used as an oxygen sensing element, for example, does not suffer from a change in the control point, reduction in the output, and deterioration of the operating response. Thus, the sensing element having the present porous protective layer has significantly improved durability.

The present electrochemical element may be easily and efficiently produced, since the porous protective layer covering the electrode may be formed only by firing the ceramic green sheet of the invention. Further, the porous protective layer is formed integrally with the electrode upon firing of the ceramic green sheet, thereby assuring improved mechanical strength of the electrochemical element. Namely, the porous protective layer formed by firing the present ceramic green sheet is effectively protected from cracking due to a thermal shock, and separation from the electrode, and can be formed with a desired thickness.

BRIEF DESCRIPTION OF THE DRAWINGS

The above objects, features and advantages of the present invention will be better understood by reading the following detailed description of the invention, when considered in connection with the accompanying drawings, in which:

FIGS. 5 and 6 are graphs indicating a result of a thermal shock test and a result of a Pb corrosion test, respectively, which were conducted on the specimen according to the present invention and the comparative specimens.

DETAILED DESCRIPTION OF THE INVENTION

Figure 1A:
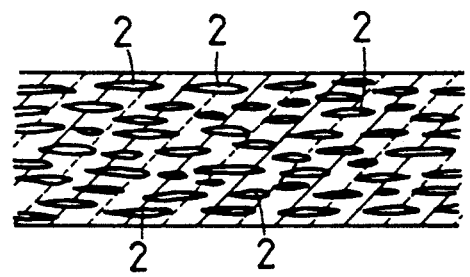
FIGS. 1(a) and 1(b) are views showing an example of a porous ceramic sheet which is obtained by firing a ceramic green sheet of the present invention, FIG. 1(a) being a cross sectional view of the ceramic sheet, and FIG. 1(b) being a fragmentary enlarged view of FIG. 1(a)

The composition for the ceramic green sheet according to the present invention includes as a major component a ceramic powder which is selected from among conventionally used ceramic materials, depending upon the application or use of the green sheet. The ceramic powder may consist essentially of alumina, spinel, cordierite or titania, or a solid solution of partially or fully stabilized zirconia with yttria, calcia or ytterbia. Alternatively, the ceramic powder may consist principally of such a solid solution, or a mixture of two or more of the ceramic powder species specified above. To the ceramic powder, there may be added a sintering aid or aids such as $SiO_2$, $Al_2O_3$, kaolin and clay, as needed, in an amount of 30% by weight or less. In particular, alumina, and zirconia doped with yttria are preferably used as the ceramic powder. More preferably, the ceramic powder consists principally of partially stabilized zirconia whose major crystal phase is cubic, or fully stabilized zirconia having a cubic crystal phase.

The composition for the present ceramic green sheet includes a flake powder in the form of planar or elongate (needle-like) flakes or flat or elongate particles as another important component, in addition to the ceramic powder as described above. The planar or elongate flakes sublime, thermally decompose or burn out, at a sintering temperature. Consequently, by firing the ceramic green sheet including such planar or elongate flakes, there is obtained a porous ceramic sheet or structure which has a multiplicity of mutually connected pores or channels.

The planar or elongate flakes may be selected from scaly or elongate powder particles such as graphite and molybdenum disulfide, or flattened, planar or fibrous organic powder particles such as starch and sugar. According to the present invention, flake or crystalline powders of graphite or molybdenum disulfide, for example, are preferably used as the flakes to be contained in the ceramic green sheet. Generally, the planar flakes are dimensioned such that the ratio of the length to the thickness thereof is at least 2/1 (2:1), preferably, at least 5/1 (5:1). It is to be understood that the opposite major surfaces of the planar flakes may have any shape, and may be more or less undulated or curled, and the opposite surfaces of each flake does not necessarily have the same shape. Generally, the elongate flakes are dimensioned such that the ratio of the length to the diameter thereof is at least 2/1(2:1), preferably, at least 5/1 (5:1). The planar or elongate flakes contained in the present ceramic green sheet may be of any kinds known in the art, provided the flakes have shapes considered to be planar or elongate, and have dimensions satisfying the above conditions.

The composition of the ceramic green sheet according to the invention includes generally 20–80%, preferably 30–70% by volume of the planar or elongate flakes of a total amount of the ceramic powder and the planar or elongate flakes.

In addition to the ceramic powder and the planar or elongate flakes, the composition of the ceramic green sheet includes a binder as another important component, which serves to facilitate forming or molding of the composition into the green sheet. The binder may be suitably selected from known binders which are conventionally used as a molding aid for ceramic powder. For example, the binder is selected from the group including binders such as ethyl cellulose, polyvinyl alcohol, polyvinyl butyral, polyacrylate, and polymethacrylate, and other synthetic resin binders. Depending upon the specific binders used, the composition may further include suitable plasticizers such as dioctyl phthalate, dibutyl phthalate, diethylene glycol and dibutyl sebacate. The binder and the plasticizer if any are generally added in a total amount of 5–40 parts by weight, per a total of 100 parts by weight of the ceramic powder and planar or elongate flakes as described above.

When a slurry is prepared for producing the ceramic green sheet, the composition consisting principally of the ceramic powder, binder, and planar or elongate flakes which have been described is mixed with a suitable amount of a solvent or a mixture of solvents, which is selected depending upon the specific binders and plasticizers used. Examples of the solvents suitably used for the slurry include: alcohol such as ethanol, 2-propanol and 1-butanol; aromatic hydrocarbons such as toluene and xylene; trichloroethylene; tetrachloroethylene; acetate; terpineol; carbitol; methyl ethyl ketone and water. The viscosity of the slurry is adjusted by the amount of the solvent.

By using the thus prepared slurry, a ceramic green sheet or layer having a desired thickness is formed on a substrate, by a suitable known method such as a doctor blade method, a calender roll method, screen printing, dipping or coating. According to the above-indicated methods, the slurry for the ceramic green sheet is applied to the substrate while a gravitational force acts on the applied slurry mass in the direction parallel to the major surfaces of the green sheet to be obtained. As a result, the planar or elongate flakes contained in the applied slurry mass are oriented in the direction of the force being applied, so that these flakes are disposed in the resulting ceramic green sheet so as to extend substantially in the direction parallel to the major surfaces of the sheet. For more positively achieving such orientation of the planar or elongate flakes in the ceramic green sheet, a mechanical or physical force may be applied to the applied slurry mass which has been formed into a sheet, in a direction parallel to the major surfaces of the sheet, while the slurry is still in a semiliquid state. In this respect, it is desirable to employ the doctor blade, calender roll or screen printing method for achieving better orientation of the planar or elongate flakes in the ceramic green sheet obtained. The thus formed ceramic green sheet has a thickness generally within a range of about 20–1000 μm, preferably within a range of about 100–500 μm.

Figure 1B:
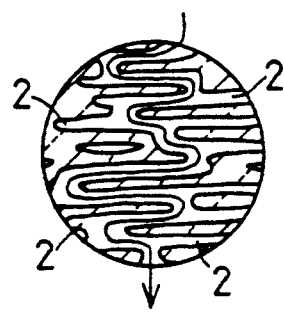
Figure 2A:
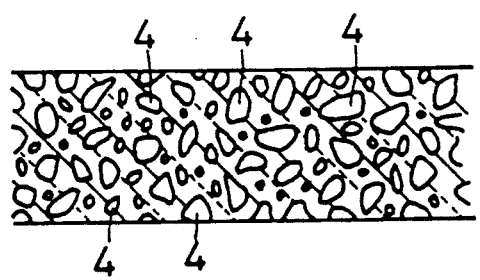
FIGS. 2(a) and 2(b) are views showing an example of a porous ceramic sheet which is obtained by firing a conventional ceramic green sheet, FIG. 2(a) being a cross sectional view of the ceramic sheet, and FIG. 2(b) being a fragmentary enlarged view of FIG. 2(a)
Figure 2B:
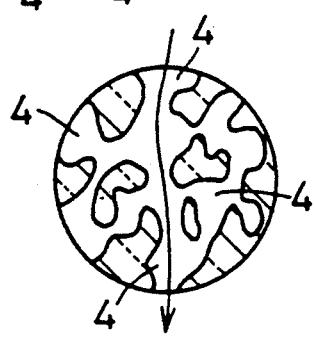

The ceramic green sheet formed on the substrate as described above is dried in air at the room temperature, or positively dried by heating, as needed. The dried green sheet is then fired in the atmosphere, or in an oxidizing, reducing or inert atmosphere. In this manner, there is obtained a porous ceramic layer or sheet as shown in FIGS. 1(a) and 1(b), which has planar or elongate pores that are oriented in the direction parallel to the major surfaces of the ceramic body, and are mutually connected for communication therebetween. The thus obtained porous ceramic body has a porosity generally in a range of about 20–80%, preferably in a range of about 30–60%.

The thus obtained porous ceramic sheet may be favorably used for various purposes, by utilizing its unique porous structure wherein the planar or elongate pores are oriented in the direction parallel to the major surfaces of the ceramic sheet. For instance, the present ceramic body may be used as a ceramic filter, or a partition plate or wall used on a fuel cell, or may be suitably used as a protective layer for protecting an electrode or electrodes of an electrochemical element such as an oxygen sensing element, as will be described below.

Figure 3:
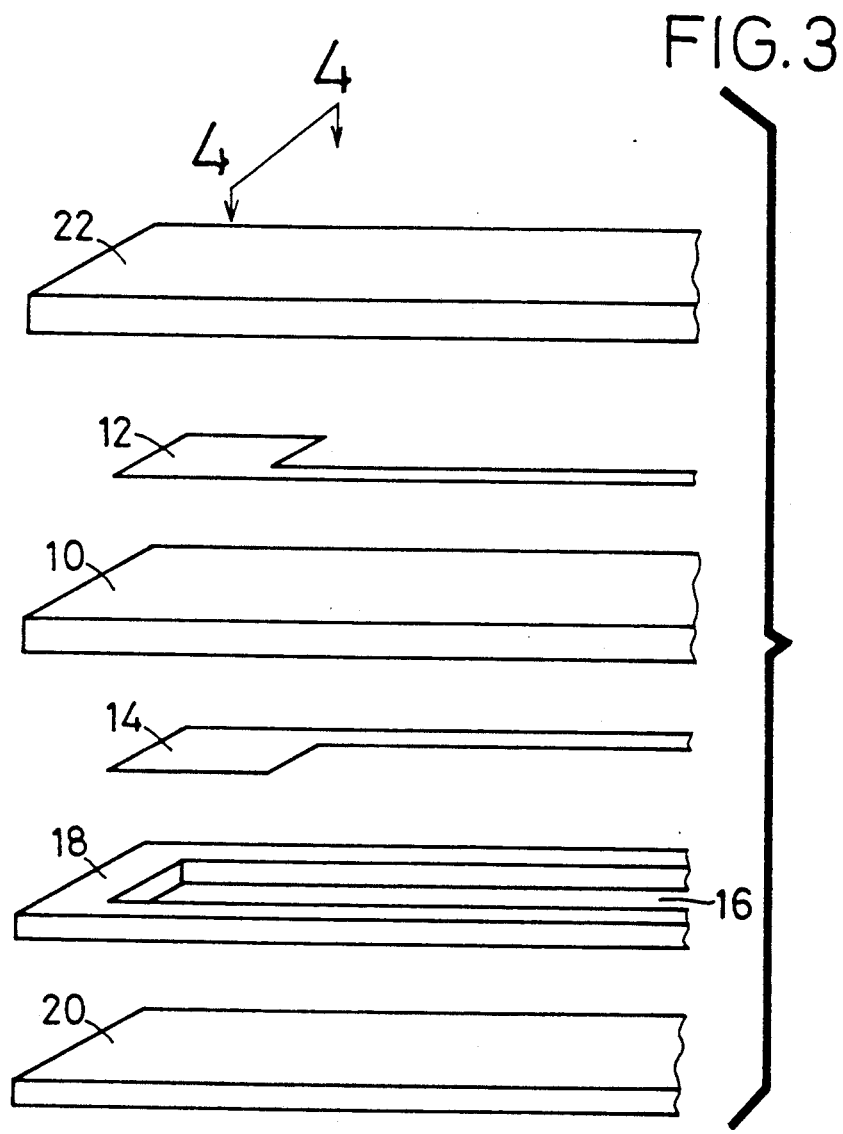
FIG. 3 is a fragmentary exploded perspective view showing an example of an electrochemical element produced according to the present invention.
Figure 4:
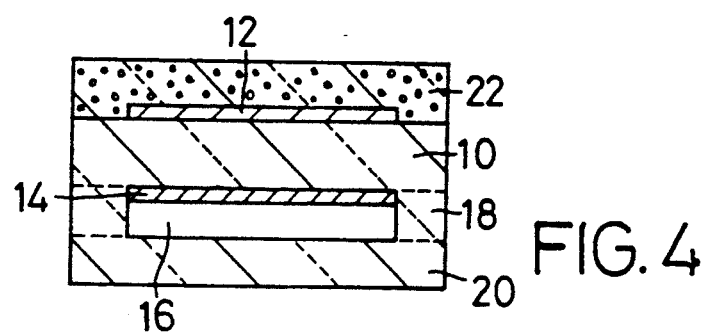
FIG. 4 is an elevational view in cross section taken along line 4—4 of FIG. 3.

Referring next to FIGS. 3 and 4, there is shown an example of the basic construction of such an electrochemical element in the form of an oxygen sensing element having a porous electrode protective layer.

In these figures, reference numeral 10 designates an oxygen-ion conductive solid electrolyte body. On the opposite major surfaces of the solid electrolyte body 10, there are formed a measuring electrode 12 and a reference electrode 14. On the major surface of the solid electrolyte body 10 which bears the reference electrode 14, there are formed a spacer layer 18 and a covering layer 20, such that the spacer layer 18 is interposed between the solid electrolyte body 10 and the covering layer 20. The spacer layer 18 has an elongate rectangular opening, and cooperates with the solid electrolyte body 10 and the covering layer 20 to define a gas inlet passage 16 for communication of the reference electrode 14 with a reference gas such as the ambient air. The major surface of the solid electrolyte body 10 which bears the measuring electrode 12 is covered by a porous electrode protective layer 22 which is prepared from a ceramic green sheet produced according to the principle of the present invention, and which has a porous structure as shown in FIGS. 1(a) and 1(b). In this arrangement, the measuring electrode 12 is protected by the porous protective layer 22 from direct exposure to a subject gas (measurement gas). Thus, the oxygen sensing element has a laminar structure. It is to be understood that in this oxygen sensing element, the solid electrolyte body 10, measuring and reference electrodes 12, 14, and spacer and covering layers 18, 20 are all made of conventionally used materials known to those skilled in the art.

In operation of the thus constructed oxygen sensing element, a measurement gas such as exhaust gases emitted from an internal combustion engine is brought into contact with the measuring electrode 12 through the electrode protective layer 22, while the reference electrode 14 is exposed to the reference gas (e.g., an ambient air) which has a known oxygen concentration. An electromotive force is induced between the measuring and references electrodes 12, 14, according to the principle of an oxygen concentration cell, based on a difference in the oxygen concentration between the atmospheres which contact or communicate with the two electrodes 12, 14. This electromotive force is used as an output signal of the sensing element, which represents the oxygen concentration of the measurement gas.

In the instant oxygen sensing element, the protective layer 22 for protecting the measuring electrode 12 exposed to the measurement gas consists of a porous ceramic sheet having the porous structure as shown in FIGS. 1(a) and 1(b). In this case, the measurement gas passes through relatively long minute channels formed through the protective layer 22, such that the corrosive substances existing in the measurement gas flowing through the channels are prevented from reaching the measurement electrode 12, due to absorption or deposition on the wall surfaces which define the minute channels. Therefore, the measuring electrode 12 is protected against deterioration by the corrosive substances in the measurement gas, whereby the oxygen sensing element does not suffer from a change in the control point, reduction in the output, and deterioration of the operating response. Thus, the instant oxygen sensing element has a high degree of durability.

There will be hereinafter described a manner of producing the instant oxygen sensing element. Initially, there is prepared an unfired solid electrolyte body (10) formed of a known solid electrolyte material and having a thickness of about 100 $\mu$m–1 mm. An unfired material for the electrodes is applied to the unfired solid electrolyte body, by a known method such as screen printing, transferring, spraying, coating or spinning, to thereby form unfired electrode layers (12, 14) having a suitable thickness (about 3–30 $\mu$m) on the solid electrolyte body (10). The material for the electrodes 12, 14 is well known in the art, for example, an electrically conductive metal such as platinum, palladium or rhodium, or a cermet-forming mixture of such electrically conductive metal and a ceramic powder such as alumina and zirconia. Then, an unfired material for the electrode protective layer 22, that is, a ceramic green sheet according to the invention is formed on one of the opposite major surfaces of the unfired solid electrolyte body (10), by the above-indicated known method. In this embodiment, the ceramic green sheet is formed so as to cover at least the unfired measuring electrode (12). Further, unfired masses for the spaced layer 18 and the covering layer 20 are formed on the other major surface of the unfired solid electrolyte body (10), by using a known material which is usually similar to the material of the solid electrolyte body 10. The unfired layers for the solid electrolyte body 10, electrodes 12, 14, electrode protective layer 22, and spacer and covering layers 18, 20 are co-fired to produce a fired laminar structure as the oxygen sensing element.

The same oxygen sensing element may be produced in an alternative manner as described below. Namely, a plurality of unfired electrode layers (12, 14) are formed on the opposite major surfaces of an unfired solid electrolyte body (10), and unfired spacer and covering layers (18, 20) are formed on the other major surface of the unfired solid electrolyte body if necessary, to thereby obtain an unfired laminar structure (10, 12, 14, 18, 20). After firing of this laminar structure, the ceramic green sheet for the electrode protective layer 22 is formed so as to cover at least one (12) of the fired electrodes, by the above-indicated method, and is fired to provide the electrode protective layer 22. In a still further alternative method of producing the oxygen sensing element, the unfired layers for the reference electrode 14, and the spacer and covering layers 18, 20 if necessary, are formed on the unfired solid electrolyte body (10). After an unfired laminar structure obtained is then fired, the unfired layer for the measuring electrode 12 and the ceramic green sheet for the protective layer (12) are formed on the fired structure, and the unfired electrode layer (12) and the green sheet (22) are fired.

The oxygen sensing element may also be produced by using the solid electrolyte body 10 which has been fired. In this case, the unfired electrode layers (12, 14) are formed on the fired solid electrolyte body 10, and the ceramic green sheet for the porous protective layer is formed so as to cover the unfired measuring electrode (12). Further, the unfired spacer layer (18) and the unfired covering layer (20) are formed on the fired solid electrolyte body 10. Subsequently, the unfired layers (12, 14, 18, 20, 22) are co-fired to produce the oxygen sensing element. In the present method, sputtering, electroless plating, or vacuum vapor deposition as well as the above-indicated methods may be used for forming the unfired electrode layers (12, 14) on the fired solid electrolyte body 10. When the sputtering, electroless plating or vacuum vapor deposition is practiced, the unfired electrodes (12, 14) may be formed with a thickness of about 0.3–5 $\mu$m.

For improving the integrity between the electrode protective layer 22 and the solid electrolyte body 10, it is desirable that the coefficient of thermal expansion of the electrode protective layer 22 provided in the present oxygen sensing element be substantially the same as or close to that of the solid electrolyte body 10 which serves as a substrate for the layer 22. To this end, the ceramic powder for the ceramic green sheet to give the protective layer 22 is preferably the same as the material for the solid electrolyte body 10. More preferably, the electrode protective layer 22 is formed of a fully stabilized zirconia while the solid electrolyte body 10 is formed of a partially stabilized zirconia. In this case the thermal stability of the protective layer 22 and the strength of the solid electrolyte body 10 are compatible and are both improved.

According to the present invention, the porous electrode protective layer 22 includes planar or elongate pores which occur upon sublimation of the planar or elongate flakes contained in the ceramic green sheet. In this regard, it is preferable that the protective layer 22 is formed of a composition which has a lower degree of sinterability than the material of the solid electrolyte body 10. In this case, the porous structure of the layer 22 is provided with smaller or more minute pores in addition to the planar or elongate pores, when the protective layer 22 and the solid electrolyte body 10 are co-fired.

The protective layer 22 may consist of a plurality of sub-layers, rather than a single layer. In this case, the sub-layer which is nearest to the electrode 12 may have a higher porosity than the other sub-layer(s). Alternatively, the sub-layer remote from the electrode 12 may have a higher porosity than the other sub-layer(s). Further, a second porous layer whose porosity and pore size are different from those of the protective layer 22 may be interposed between the layer 22 and the measuring electrode 12.

While the present invention has been described as applied to the oxygen sensing element as an electrochemical element having a typical basic constructional arrangement, it is to be understood that the invention may be equally applied to the other types of known oxygen sensing elements having different constructional arrangements, and the other electrochemical elements.

For example, the electrochemical element using the ceramic green sheet of the present invention may be provided with suitable heating means for maintaining an optimum operating temperature of the element. In this instance, the heating means may be either incorporated or built in the electrochemical element, or may be a separate heating member attached to the electrochemical element.

Although the illustrated electrochemical element of FIGS. 3 and 4 has a generally elongate planar configuration, the present invention may apply to an electrochemical element which has different configurations or shapes such as a tubular or cylindrical shape well known in the art. The illustrated oxygen sensing element has only a single electrochemical cell consisting of the solid electrolyte body 10 and the two electrodes 12, 14. However, the invention is applicable to an electrochemical element having a plurality of electrochemical cells, for example, an electrochemical oxygen pumping cell and an electrochemical oxygen sensing cell, as disclosed in U.S. Pat. No. 4,861,456 corresponding to laid-open Publication No. 60-108745 of unexamined Japanese Patent Application No. 58-218,399.

EXAMPLES

To further clarify the principle of the present invention, there will be described some presently preferred examples of the electrochemical element produced according to the invention. However, it is to be understood that the invention is by no means limited to the details of the examples, but may be embodied with various changes, modifications and improvements, which may occur to those skilled in the art.

EXAMPLE 1

There was prepared a powder of zirconia ($ZrO_2$) whose purity is 99.5% by weight, and about 90% of which has a particle size not larger than 2.5 $\mu$m. The $ZrO_2$ powder was wet-mixed with an aqueous solution of yttrium nitrate (85 g of $Y_2O_3$ per 1 kg of the solution), in a pot mill by using $ZrO_2$ balls, for an hour, to provide a mixture which consists of 93 mol % of $ZrO_2$ and 7 mol % of $Y_2O_3$. Then, the mixture was dried, and was calcined at 1000° C. for two hours and thus calcined. The calcined mixture was crushed into particles having 24 mesh size, to which 1% by weight of clay (24 mesh) was added. The thus obtained mixture was dry-milled in a pot mill for 24 hours and passed through a 60-mesh sieve, to thereby provide a $ZrO_2$ powder.

There was also prepared a crystalline graphite powder in the form of scaly flakes, whose purity is at least 99.5% by weight, and about 90% of which has a particle size not larger than 20 $\mu$m. In a pot mill using zirconia balls having a diameter of 10 mm, there were introduced 70 parts by weight of the $ZrO_2$ powder, 30 parts by weight of the crystalline graphite powder, 10 parts by weight of polyvinyl butyral resin, 6 parts by weight of dibutyl phthalate, and 100 parts by weight of toluene + 2-propanol mixture solvent. The solvent consists of 1 part by weight of toluene and 1 part by weight of 2-propanol. The introduced materials were mixed in the mill for ten hours, and the mixture was passed through a 140-mesh sieve, whereby a slurry having a viscosity of 10000 cps was prepared.

By using the obtained slurry, a $ZrO_2$ green sheet (ceramic green sheet) according to the invention was formed by a doctor blade method, so that the sheet has a thickness of 300 $\mu$m after the drying. Then, the green sheet was dried at 100° C. for two hours, and fired at 1400° C. for two hours, whereby a porous ceramic sheet was prepared. The ceramic sheet has a multiplicity of pores which are orientated in a direction parallel to the major surfaces of the sheet, as shown in FIGS. 1(a) and 1(b), and has an open pore percent of 50%.

EXAMPLE 2

There was prepared a powder of $Al_2O_3$ whose purity is 99.9% by weight, and about 90% of which has a particle size not larger than 2 $\mu$m. As a sintering aid, 3% by weight of kaolin was added to the $Al_2O_3$ powder, and the obtained mixture was dry-milled in a pot mill for 24 hours, by using alumina balls having diameter of 10 mm, and passed through a 60-mesh sieve, to provide an $Al_2O_3$ powder.

There was also prepared a powder of molybdenum disulfide ($MoS_2$) in the form of scaly flakes, whose purity is at least 99% by weight, and about 90% of which has a particle size not larger than 10 $\mu$m. In a pot mill by using alumina balls having a diameter of 10 mm, there were introduced 50 parts by weight of the $Al_2O_3$ powder, 50 parts by weight of the $MoS_2$ powder, 10 parts by weight of polybutyl methacrylate, 2 parts of dioctyl phthalate, and 50 parts of toluene as a solvent. The introduced materials were mixed in the mill for ten hours, and the mixture was passed through a 140-mesh sieve, whereby a slurry having a viscosity of 20000 cps was prepared.

By using the obtained slurry, an alumina green sheet (ceramic green sheet) according to the invention was formed by a doctor blade method, so that the sheet has a thickness of 300 $\mu$m after the drying. The green sheet was fired under argon gas at 1200° C. for two hours, whereby a porous ceramic sheet was prepared. The ceramic sheet has a multiplicity of pores which are orientated in a direction parallel to the major surfaces of the sheet, as shown in FIGS. 1(a) and 1(b), and has an open pore percent of 40%.

EXAMPLE 3

A planar ceramic green sheet having a thickness of 500 $\mu$m was formed of a composition which includes 100 parts by weight of a powder consisting of 96 mol % of $ZrO_2$, 4 mol % of $Y_2O_3$, and 3% by weight of clay as a sintering aid, 12 parts by weight of polyvinyl butyral resin, and 5 parts by weight of dioctyl phthalate.

By using the obtained $ZrO_2$ green sheet as a solid electrolyte body 10, an oxygen sensing element as shown in FIGS. 3 and 4 was produced in the following manner. A 10 $\mu$m thickness of electrically conductive paste for an electrode was applied to each of the opposite major surfaces of the green sheet, by screen printing. The electrically conductive paste consists of 80 parts by weight of a platinum powder, and 20 parts by weight of a $ZrO_2$ powder containing 4 mol % of $Y_2O_3$. Then, the electrically conductive paste was dried at 100° C. for 20 min., to provide unfired electrode layers (12, 14) on the $ZrO_2$ green sheet.

Thereafter, a ceramic green sheet which gives the porous ceramic sheet as produced in Example 1 was formed on one major surface of the above-indicated $ZrO_2$ green sheet so as to cover one of unfired electrode layers (12), to provide an unfired electrode protective layer (22). On the other major surface of the $ZrO_2$ green sheet on which an unfired electrode layer (14) is formed, there were formed an unfired spacer layer (18) and an unfired covering layer (20) both of which consist of the same $ZrO_2$ green sheet. The laminated unfired layers were compacted under pressure and heat to provide an unfired laminar structure (10, 12, 14, 18, 20, 22). This laminar structure was then fired in the atmosphere at 1400° C. for two hours. In this manner, there was produced the oxygen sensing element (electrochemical element) of FIGS. 3 and 4 having the electrode protective layer 22 in which planar pores are oriented in the direction substantially parallel to the major surface of the element. The produced oxygen sensing element demonstrates a high degree of durability.

EXAMPLE 4

To the other major surface of the planar $ZrO_2$ green sheet for the solid electrolyte body 10 as produced in Example 3, there was applied by screen printing a 10 μm thickness of electrically conductive paste, which consists of 80 parts by weight of a platinum powder, and 20 parts by weight of a $ZrO_2$ powder containing 4 mol % of $Y_2O_3$. Then, the applied paste was dried at 100° C. for 20 min., to provide an unfired reference electrode layer (14). On the other major surface of the $ZrO_2$ green sheet, there were also formed an unfired spacer layer (18) and an unfired covering layer (20) as shown in FIGS. 3 and 4, to provide an unfired laminar structure (10, 14, 18, 20). This laminar structure was then fired at 1400° C. for two hours, in the atmosphere.

Subsequently, an unfired measuring electrode layer (12) made of platinum and having a thickness of 1 μm was formed on the above-indicated one major surface of the fired $ZrO_2$ green sheet (solid electrolyte body 10), by electroless plating. Then, a ceramic green sheet which gives the porous ceramic body as produced in Example 2 was laminated on the unfired electrode layer (12), and the thus laminated unfired layers were compacted under pressure and heat to provide an unfired laminar structure on the solid electrolyte body 10. This laminar structure was fired at 1200° C. for two hours, under argon gas, whereby there was produced the highly durable oxygen sensing element having the measuring electrode 12 which is covered by the porous protective layer 22 in which pores are oriented in a direction substantially parallel to the layer 22.

EXAMPLE 5

To the other major surfaces of the planar $ZrO_2$ green sheet for the solid electrolyte body 10 as produced in Example 3, there was applied by screen printing a mass of electrically conductive paste which consists of 80 parts by weight of a platinum powder, and 20 parts by weight of a $ZrO_2$ powder containing 4 mol % of $Y_2O_3$. Then, the applied paste was dried at 100° C. for 20 min., to provide an unfired reference electrode layer (14). On the other surface of the $ZrO_2$ green sheet for the solid electrolyte body 10, there were also formed unfired spacer and covering layers (18, 20) in the form $ZrO_2$ green sheets similar to the unfired solid electrolyte body (10). Thus, there was provided an unfired laminar structure (10, 14, 18, 20). This laminar structure was then fired in the atmosphere at 1400° C. for two hours.

On the above-indicated one major surface of the fired solid electrolyte body 10, there was formed an unfired measuring electrode layer (12) made of platinum and having a thickness of 0.7 μm, by high-frequency sputtering. Then, a mass of paste for forming the electrode protective layer 22 was applied by screen printing to the one major surface of the fired solid electrolyte body 10, to form a 100 μm thickness unfired layer (22) covering the measuring electrode layer (12). The unfired layers (12, 22) were dried at 150° C. for 30 min. under argon gas, and then fired at 1200° C. Thus, there was produced the highly durable oxygen sensing element having the porous protective layer 22 as described above.

The paste for forming the protective layer 22 was prepared in the following manner. Initially, a ceramic powder was prepared from a $ZrO_2$ powder containing 6 mol % of $Y_2O_3$ (prepared by coprecipitation and having an average particle size of 0.3 μm), to which 3% by weight of clay was added. The $ZrO_2$ powder with the clay was dry-milled for four hours in a pot mill using $ZrO_2$ balls, and passed through a 60-mesh sieve, to provide $ZrO_2$ particles. Then, 70 parts by weight of these $ZrO_2$ particles were mixed with 30 parts by weight of a $MoS_2$ powder as scaly flakes (whose purity is 99% by weight, and about 90% of which has a particle size not larger than 20 μm). Further, 12 parts by weight of polybutyl methacrylate and 100 parts by weight of terpineol were added as a solvent to 10 parts by weight of the mixture of the $ZrO_2$ and $MoS_2$ powders, and then mixed with the same for five hours in a pot mill, by using $ZrO_2$ balls having a diameter of 10 mm. Thereafter, the viscosity of the obtained mixture was suitably adjusted to provide the paste for forming the protective layer 22, which is suited for use in the screen printing method.

Evaluation of Oxygen Sensing Elements

The oxygen sensing element constructed as shown in FIGS. 3 and 4 was tested for evaluating the durability of the element. In the test, the oxygen sensing element produced according to Example 3 was used as a specimen of the present invention. A comparative oxygen sensing element "A" was prepared by using an electrode protective layer (22) in the form of a 100 μm-thick spinel layer which are formed by plasma spraying. In preparing a comparative oxygen sensing element "B", an unfired electrode protective layer (22) was formed by co-firing unfired masses of electrodes and solid electrolyte body, and a green sheet which includes as a material for forming pores a multiplicity of amorphous particles which sublime upon application of heat.

(1) Thermal Shock Test

The test specimens were subjected to repeated heat-and-cool cycles by using a burner. In each cycle, the specimens were heated to 1000° C. and cooled to 200° C. After the heat-and-cool cycles, the specimens were observed for occurrence of cracks in the electrode protective layer 22, and separation between the protective layer 22 and the measuring electrode 12, and were evaluated in terms of reliability by using Weibull distribution sheet.

(2) Pb Corrosion Test

Each of the test specimens was installed in a predetermined position within an exhaust pipe of a 2.0 l gasoline engine. The engine was continuously operated with 0.5 gPb/gal leaded gasoline while emitting an exhaust gas having a temperature of 700° C. The excess air ratio (λ) of the exhaust gas was measured by the oxygen sensing elements of the test specimens. More specifically, the excess air ratio of the exhaust gas was extremely slowly changed (e.g., from 0.95 to 1.20), to measure the excess air ratio value at the time when the electromotive force generated by the sensing elements suddenly changes. An amount of change in the excess air ratio measured during the exposure of each specimen to the exhaust gas was obtained. The corrosion resistance of the specimens against the lead (Pb) existing in the exhaust gas increases with a decrease in the amount of change in the measured excess air ratio.

Figure 5:
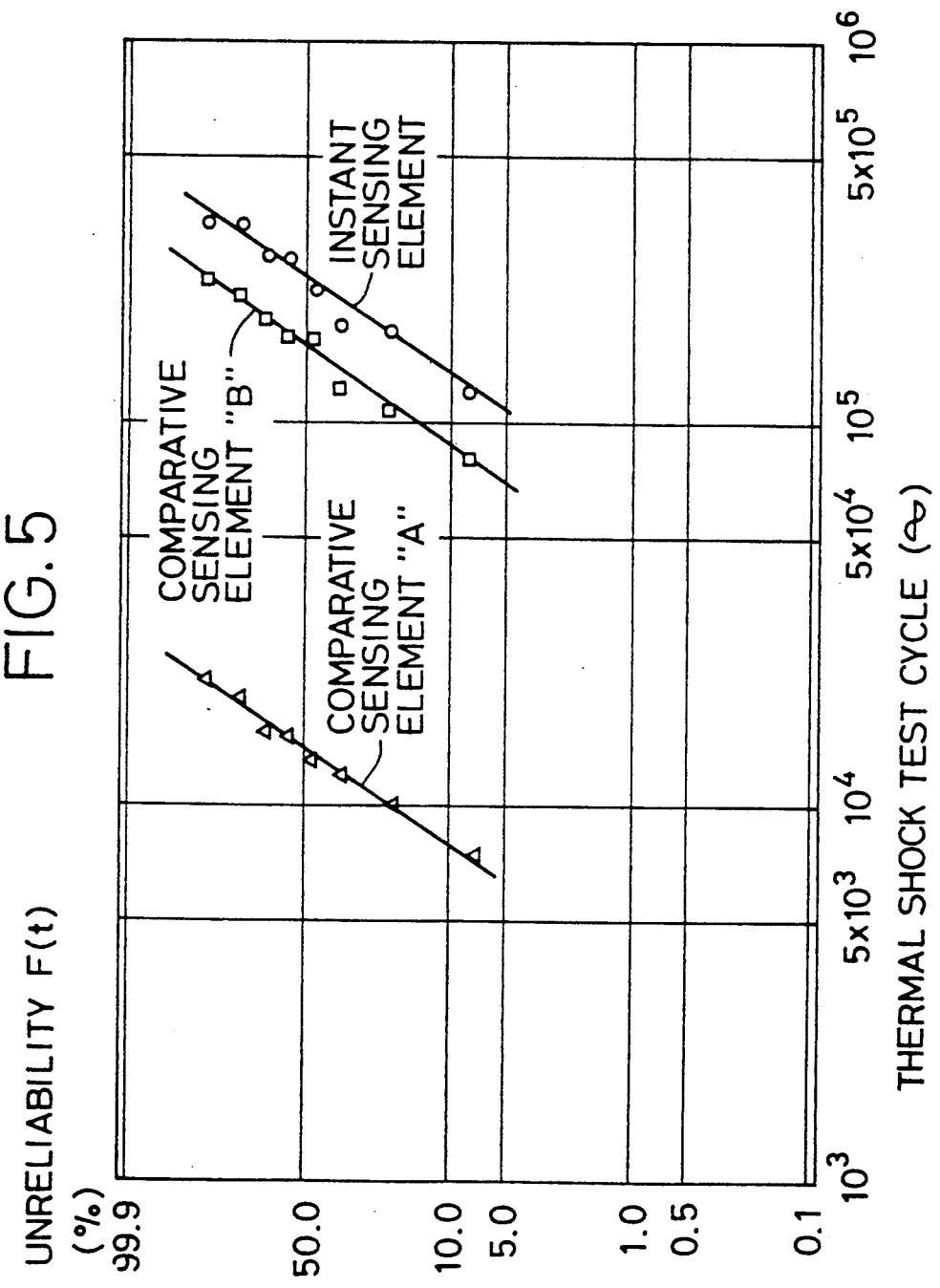

The result of the thermal shock test is indicated in FIG. 5, while the result of the Pb corrosion test is indicated in FIG. 6. It will be understood that the comparative oxygen sensing element "A" has an extremely low thermal shock resistance while the comparative oxygen sensing element "B" has an extremely low corrosion resistance with respect to lead. The instant oxygen sensing element is considerably improved in both the thermal shock resistance and the corrosion resistance, over the comparative elements "A" and "B". In the instant oxygen element, the electrode protective layer (22) consists of a porous ceramic layer having a porous structure in which a multiplicity of pores are oriented in the direction parallel to the major surfaces of the element, which pores cooperate to provide relatively long fluid flow channels. Thus, the instant element is excellent in the adherence between the solid electrolyte body and the electrodes, assuring improved capability of trapping corrosive substances.

What is claimed is:

1. A ceramic green sheet which is fired to give a porous ceramic structure, and which is formed of a composition which consists essentially of a ceramic powder, a binder, and a multiplicity of planar or elongate flakes, wherein said planar or elongate flakes are oriented in said ceramic green sheet in a direction substantially parallel to opposite major surfaces of the green sheet and decompose upon application of heat to thereby provide the porous ceramic structure with pores shaped and oriented substantially the same as said planar or elongate flakes.

2. A ceramic green sheet according to claim 1, wherein said ceramic powder consists principally of partially or fully stabilized zirconia, alumina, spinel, cordierite or titania.

3. A ceramic green sheet according to claim 1, wherein said planar or elongate flakes is selected from the group consisting of graphite, molybdenum disulfide, starch and sugar.

4. A ceramic green sheet according to claim 1, wherein the ratio of a length to a thickness of said planar or elongate flakes is at least 2/1.

5. A ceramic green sheet according to claim 1, wherein the ratio of a length to a thickness of said planar or elongate flakes is at least 5/1.

6. A ceramic green sheet according to claim 1, wherein said composition includes 20–80% by volume of said planar or elongate flakes of a total amount of said ceramic powder and said planar or elongate flakes.

7. A ceramic green sheet according to claim 1, wherein said composition includes 30–80% by volume of said planar or elongate flakes of a total amount of said ceramic powder and said planar or elongate flakes.

8. A ceramic green sheet according to claim 1, further comprising a plasticizer, and wherein said binder and said plasticizer are present in a total amount of 5–40 parts by weight, per a total of 100 parts by weight of said ceramic powder and said planar or elongate flakes.

9. A porous sintered ceramic article consisting essentially of:
   a first major surface and an opposed second major; and
   a porous structure having a plurality of interconnected pores each of which has a generally planar to elongate shape and is oriented in a direction substantially parallel to said opposed major surfaces, whereby said porous structure provides gaseous communication from said first major surface to said second major surface.

* * * * *